United States Patent
Hoffmann et al.

(10) Patent No.: US 10,001,760 B1
(45) Date of Patent: Jun. 19, 2018

(54) ADAPTIVE CONTROL SYSTEM CAPABLE OF RECOVERING FROM UNEXPECTED SITUATIONS

(71) Applicant: HRL Laboratories, LLC, Malibu, CA (US)

(72) Inventors: Heiko Hoffmann, Simi Valley, CA (US); David W. Payton, Calabasas, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days. days.

(21) Appl. No.: 14/748,216

(22) Filed: Jun. 23, 2015

Related U.S. Application Data (60) Provisional application No. 62/057,633, filed on Sep. 30, 2014.

(51) Int. Cl.
*G01C 22/00* (2006.01)
*G05D 1/00* (2006.01)
*G05B 13/04* (2006.01)

(52) U.S. Cl.
CPC .................. *G05B 13/048* (2013.01)

(58) Field of Classification Search
USPC ......................................................... 701/27
See application file for complete search history.

(56) References Cited

U.S. PATENT DOCUMENTS

| | | | | |
|---|---|---|---|---|
| 5,467,883 A | * | 11/1995 | Frye | G05B 13/027 156/345.24 |
| 5,653,894 A | * | 8/1997 | Ibbotson | G05B 13/027 216/59 |
| 6,169,981 B1 | * | 1/2001 | Werbos | G05B 13/0265 706/15 |
| 6,459,175 B1 | * | 10/2002 | Potega | B60L 11/185 307/132 M |

(Continued)

FOREIGN PATENT DOCUMENTS

| | | | |
|---|---|---|---|
| EP | 1804153 A1 | * | 7/2007 |
| EP | 2631798 A2 | * | 8/2013 |
| JP | 2012-230701 | | 11/2012 |

OTHER PUBLICATIONS

Fahlman, S and Lebiere, C. The cascade-correlation learning architecture. In Adv. in Neural Info. Processing Systems II, pp. 524-532. San Francisco, CA: Morgan Kaufmann, 1990.

(Continued)

*Primary Examiner* — Jean Paul Cass
(74) *Attorney, Agent, or Firm* — Tope-McKay & Associates (57) ABSTRACT

Described is a system for generating an adaptable predictive model of the dynamics of a complex system, such as a vehicle. A set of current sensory data describing the vehicle's current state is collected from the vehicle. A set of predictive models is evaluated to identify a predictive model that best matches the vehicle's current state. If a predictive model is identified as a match, then the predictive model is (Continued)

adapted to better fit the vehicle's current state, resulting in an adapted predictive model. If a match is not identified, then a new predictive model is generated through automatic model learning using the current set of sensory data. The adapted predictive model or the new predictive model is then used to generate control outputs for the vehicle.

24 Claims, 8 Drawing Sheets

(56) References Cited

U.S. PATENT DOCUMENTS

| | | | | |
|---|---|---|---|---|
| 6,611,737 | B1* | 8/2003 | El-Tahan | G05D 1/0206 701/21 |
| 7,480,640 | B1* | 1/2009 | Elad | G06Q 10/10 706/14 |
| 7,590,589 | B2* | 9/2009 | Hoffberg | G06Q 20/401 705/35 |
| 7,970,676 | B2* | 6/2011 | Feinstein | G06Q 20/10 705/35 |
| 8,600,830 | B2* | 12/2013 | Hoffberg | G06Q 30/0207 705/14.71 |
| 8,805,110 | B2* | 8/2014 | Rhoads | G06F 17/30241 382/255 |
| 8,892,446 | B2* | 11/2014 | Cheyer | G06F 17/3087 704/275 |
| 9,110,452 | B2* | 8/2015 | Blevins | G05B 17/02 |
| 9,318,108 | B2* | 4/2016 | Gruber | G10L 15/1815 |
| 9,697,822 | B1* | 7/2017 | Naik | G10L 15/063 |
| 9,818,136 | B1* | 11/2017 | Hoffberg | G06Q 30/0282 |
| 2005/0096950 | A1* | 5/2005 | Caplan | G06Q 10/06314 705/7.24 |
| 2007/0055392 | A1 | 3/2007 | Amato et al. | |
| 2007/0162216 | A1* | 7/2007 | Choi | F02D 35/023 701/103 |
| 2007/0239310 | A1 | 10/2007 | Fan | |
| 2008/0183386 | A1* | 7/2008 | Klausner | G01C 21/26 701/472 |
| 2010/0138004 | A1 | 6/2010 | Chia et al. | |
| 2010/0179741 | A1* | 7/2010 | Pelosse | B60W 30/143 701/96 |
| 2011/0125293 | A1 | 5/2011 | Havlena | |
| 2011/0196514 | A1* | 8/2011 | Cao | G05B 13/048 700/50 |
| 2012/0158624 | A1* | 6/2012 | Lingenfelder | G06F 17/18 706/12 |
| 2012/0290505 | A1* | 11/2012 | Eder | G06Q 10/06 705/36 R |
| 2013/0212277 | A1* | 8/2013 | Bodik | G06F 9/4887 709/226 |
| 2013/0227584 | A1* | 8/2013 | Greene | G06F 9/5083 718/104 |
| 2014/0088989 | A1* | 3/2014 | Krishnapuram | G06F 19/3443 705/2 |
| 2016/0004987 | A1* | 1/2016 | Shroff | G06Q 10/06375 705/7.37 |

OTHER PUBLICATIONS

Frean, M. The upstart algorithm: A method for constructing and training feedforward neural networks. Neural Computation, 2, pp. 198-209, 1990.

Islam M, Sattar A, Amin F, Yao X, and Murase K. A New Adaptive Merging and Growing Algorithm for Designing Artificial Neural Networks. IEEE Transactions on Systems, Man, and Cybernetics, Part B: Cybernetics, vol. 39, pp. 705-722, 2009.

Martin, C. E. Adapting Swarm Intelligence for the Self-Assembly and Optimization of Networks (Dissertation). College Park, MD: University of Maryland. 2011, pp. 1-218.

Gruau, F., Whitley, D., and Pyeatt, L. A comparison between cellular encoding and direct encoding for genetic neural networks. In \emph{Proceedings of the 1st annual conference on genetic programming (GECCO '96)}pp. 81-89, Cambridge, MA: MIT Press. 1996.

Jiang, F., Berry, H. And Schoenauer, M. Supervised and evolutionary learning of echo state networks. \emph{Lecture Notes in Computer Science (including subseries Lecture Notes in Artificial Intelligence and Lecture Notes in Bioinformatics)}, 5199, pp. 215-224, 2008.

Wieland, A. Evolving neural network controllers for unstable systems. In \emph{Proceedings of the international joint on neural networks (IJCNN '91)}, vol. 2, pp. 667-673, New York: IEEE. 1991. conference.

International Search Report of the International Searching Authority for PCT/US2015/053117; dated Feb. 3, 2016.

The Written Opinion of the International Searching Authority for PCT/US2015/053117; dated Feb. 3, 2016.

"Google's Self-Driving Cars: 300,000 Mites Logged, Not a Single Accident Under Computer Control". The Atlantic. Retrieved Aug. 10, 2012.

"Google Cars Drive Themselves, in Traffic". New York Times, Oct. 10, 2010.

Christopher Urmson, et al., "Autonomous driving in urban environments: Boss and the Urban Challenge," Journal of Field Robotics Specia Issue on the 2007 DARPA Urban Challenge, Part 1, vol. 25, No. 8, Jun. 2008, pp. 425-466.

Masahiko Haruno, Daniel M. Wolpert, Mitsuo Kawato. MOSAIC Modal for Sensorimotor Learning and Control. Neural Computation 13, 2201-2220 (2001).

5. J Bonnard, V Zykov, H Lipson, "Resilient Machines Through Continuous Self-Modeling," Science 314 (5802) Nov. 17, 2006, pp. 1118-1121.

Drucker, H., Burges, C.J., Kaufman, L., Smola, A., and Vapnik, V.N., "Support Vector Regression Machines", in Advances in Neural Information Processing Systems 9, NIPS 1996, 155-161, MIT Press, 1997.

Schaal, Stefan, and Christopher G. Atkeson. "Constructive incremental learning from only local information." Neural Computation 10(8). pp. 2047-2084, 1998.

Martion, C.E. and Hoffmann, H., "Fast Re-learning of a Controller from Sparse Data," IEEE International Conference on Systems, Man, and Cybernetics, 2014, pp. 973-978.

Sylvain Koos, Antoine Cully and Jean-Baptiste Mouret, "Fast Damage Recovery in Robotics with the T-Resilience Algorithm," arXiv:1302.0386v1, Feb. 2013.

Rawlings, J. B., E. S. Meadows, and K. R. Muske. "Nonlinear model predictive control: A tutorial and survey." Advanced Control of Chemical Processes (1994): pp. 203-214.

A tutorial on support vector regression, Alex J. Smola and Bernhard SCHoelkopf, Statistics and Computing 14: pp. 199-222, 2004, http://alex.smola.org/papers/2004/SmoSch04.pdf.

Rasmussen, C. E. (2004). "Gaussian Processes in Machine Learning". Advanced Lectures on Machine Learning. Lecture Notes in Computer Science 3176. pp. 63-71.

Pearson, K. (1901). "On Lines and Planes of Closest Fit to Systems of Points in Space" (PDF). Philosophical Magazine 2 (11): pp. 559-572. http://stat.smmu.edu.cn/history/pearson1901.pdf.

Oja E. A simplified neuron model as a principal component analyzer. Journal of Mathematical Biology 15(3): pp. 267-273, 1982.

Ouyang S, Bao Z, Liao GS. Robust recursive least squares learning algorithm for principal component analysis. IEEE Transactions on Neural Networks 11(1): pp. 215-221, 2000.

Hoffmann, H., Schaal, S., and Vijayakumar, S. Local dimensionality reduction for non-parametric regression. Neural Processing Letters, vol. 29, pp. 109-131, 2009.

Elizondo E, Birkenhead R, Gongora M, et al. Analysis and test of efficient methods for building recursive deterministic perceptron neural networks. Neural Networks, vol. 20, pp. 1095-1108, 2007.

* cited by examiner

ADAPTIVE CONTROL SYSTEM CAPABLE OF RECOVERING FROM UNEXPECTED SITUATIONS

CROSS-REFERENCE TO RELATED APPLICATIONS

This is a Non-Provisional patent application of U.S. Provisional Application No. 62/057,633, filed in the United States on Sep. 30, 2014, entitled, "Method for Fast Controller Adaptation from Sparse Data," which is incorporated herein by reference in its entirety.

BACKGROUND OF INVENTION

(1) Field of Invention

The present invention relates to a system for adjusting a predictive model to a changing environment and, more particularly, to a system for vehicle commands and concurrently adjusting a predictive model to a changing environment by linking dynamic model selection, model adaptation, and model extrapolation.

(2) Description of Related Art

Existing autonomous systems (e.g., vehicles) use a predictive model of the system and its environment. For instance, although Google™ (located at 1600 Amphitheatre Parkway, Mountain View, Calif. 94043) demonstrated autonomous driving for 300,000 miles, it still had to use the emergency stop button a few times (see the List of Incorporated Literature References, Literature Reference Nos. 1 and 2). Since Americans alone drive more than 2 trillion miles per year, this amount would scale up the failures to a huge number. Current autonomous systems cannot deal with the complexities of the real world. The state-of-the-art in autonomous driving uses predictive models for control (see Literature Reference No. 3). However, only a single model is used, which cannot match all possible situations, such as variations of road conditions, variations in vehicle performance due to damage, and weather conditions.

Multiple predictive models have been used in computational models of human motor control (see Literature Reference No. 4), but have not been applied to autonomous systems. Even in these methods, the multiple models remain fixed and are not adapted or extrapolated based on new experiences.

Other work on resilient machines (such as described in Literature Reference No. 5) makes the machine use random exploration to determine its morphology. The limitation of that approach is that it takes too long for the system to uncover its morphology to react in time to avoid catastrophe (e.g., too long for cars and aircraft, but fast enough for rovers on Mars). The prior art disclosed in Literature Reference No. 6 aimed to improve the adaptation speed by optimizing for behaviors that avoid differences between a simulation of a model of the autonomous system/robot and the real world. This approach, however, is still very slow (i.e., 20 minutes to recover a hexapod robot from a broken leg as described in Literature Reference No. 6).

Thus, a continuing need exists for a system that quickly adjusts a predictive model to a changing environment while concurrently controlling the vehicle.

SUMMARY OF THE INVENTION

The present invention relates to a system for adjusting a predictive model to a changing environment and, more particularly, to a system for vehicle commands and concurrently adjusting a predictive model to a changing environment by linking dynamic model selection, model adaptation, and model extrapolation. The system comprises one or more processors and a memory having instructions such that when the instructions are executed, the one or more processors perform multiple operations. The system first collects a set of current sensory data from the vehicle, wherein the set of sensory data describes the vehicle's current state. Each predictive model in a plurality of predictive models is evaluated to identify a predictive model that best matches the vehicle's current state. If a predictive model in the plurality of predictive models is identified as a match, then the predictive model is adapted to better fit the vehicle's current state, resulting in an adapted predictive model. If a match is not identified in the plurality of predictive models, then a new predictive model is generated through automatic model learning using the current set of sensory data. Control outputs for the vehicle are generated using the adapted predictive model or the new predictive model.

In another aspect, the adapted predictive model or the new predictive model is stored in a model database comprising the plurality of predictive models.

In another aspect, a recent history of sensory data and previous control outputs for each predictive model in the plurality of predictive models are compared against the current sensory data describing the vehicle's current state in order to identify a best match.

In another aspect, the current set of sensory data is extrapolated to new data regions.

In another aspect, an identification of a match in the plurality of predictive models is performed using a down-select method that compares the plurality of predictive models over at least two time intervals.

In another aspect, the at least two time intervals are such that a majority of the plurality of predictive models are compared over a first time interval having a length, and only the best matches within that majority are compared over a second time interval having a length that is shorter than the length of the first time interval.

In another aspect, the plurality of predictive models are compared over a cascade of time intervals, wherein a number of the plurality of predictive models compared at progressively shorter time intervals is progressively reduced.

In another aspect, the present invention also comprises a method for causing a processor to perform the operations described herein and performing the listed operations.

Finally, in yet another aspect, the present invention also comprises a computer program product comprising computer-readable instructions stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The present invention relates to a system for adjusting a predictive model to a changing environment and, more particularly, to a system for adjusting a predictive model to a changing environment by linking dynamic model selection, model adaptation, and model extrapolation. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

Before describing the invention in detail, first a list of incorporated literature references used in the description is provided. Next, a description of various principal aspects of the present invention is provided. Finally, specific details of the present invention are provided to give an understanding of the specific aspects.

(1) LIST OF INCORPORATED LITERATURE REFERENCES

The following references are cited and incorporated throughout this application. For clarity and convenience, the references are listed herein as a central resource for the reader. The following references are hereby incorporated by reference as though fully included herein. The references are cited in the application by referring to the corresponding literature reference number, as follows:

1. "Google's Self-Driving Cars: 300,000 Miles Logged, Not a Single Accident Under Computer Control". The Atlantic. http://www.theatlantic.com/technology/archive/2012/08/googles-self-driving-cars-300-000-miles-logged-not-a-single-accident-under-computer-control/260926/taken on Aug. 21, 2014.
2. "Google Cars Drive Themselves, in Traffic". The New York Times. http://www.nytimes.com/2010/10/10/science/10google.html?pagewanted=all&_r=0, taken on Aug. 21, 2014.
3. Urmson et al., "Autonomous driving in urban environments: Boss and the Urban Challenge," Journal of Field Robotics Special Issue on the 2007 DARPA Urban Challenge, Part I, Vol. 25, No. 8, pp. 425-466, 2008.
4. Haruno, M., Wolpert, D. M., Kawato, M., "MOSAIC Model for Sensorimotor Learning and Control," Neural Computation 13, 2201-2220, 2001.
5. Bongard, J., Zykov, V., Lipson, H. Science 314 (5802), 1118-1121.
6. Koos, S., Cully, A., and Mouret, J-B., "Fast Damage Recovery in Robotics with the T-Resilience Algorithm," arXiv: 1302.0386v1.
7. Drucker, H., Burges, C. J., Kaufman, L., Smola, A., and Vapnik, V. N., "Support Vector Regression Machines," in Advances in Neural Information Processing Systems 9, NIPS 1996, 155-161, MIT Press, 1997.
8. Haridy, S. K. "Incremental learning algorithm for function approximation and its realization using neural networks," Circuits and Systems, IEEE 46th Midwest Symposium, vol. 2, pp. 986-989, 2003.
9. Schaal, S., and Atkeson, C. G., "Constructive incremental learning from only local information," Neural Computation 10(8), pp. 2047-2084, 1998.
10. Martin, C. E. and Hoffmann, H., "Fast Re-learning of a Controller from Sparse Data," IEEE International Conference on Systems, Man, and Cybernetics, 2014.
11. Bongard, J. and Lipson, H., "Automated reverse engineering of nonlinear dynamical systems," Proceedings of the National Academy of Sciences, 2007.

(2) PRINCIPAL ASPECTS

The present invention has three "principal" aspects. The first is a system for adjusting a predictive model to a changing environment and, more particularly, to a system for adjusting a predictive model to a changing environment by linking dynamic model selection, model adaptation, and model extrapolation. The system is typically in the form of a computer system operating software or in the form of a "hard-coded" instruction set. This system may be incorporated into a wide variety of devices that provide different functionalities, such as a robot or other device. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

Figure 1:
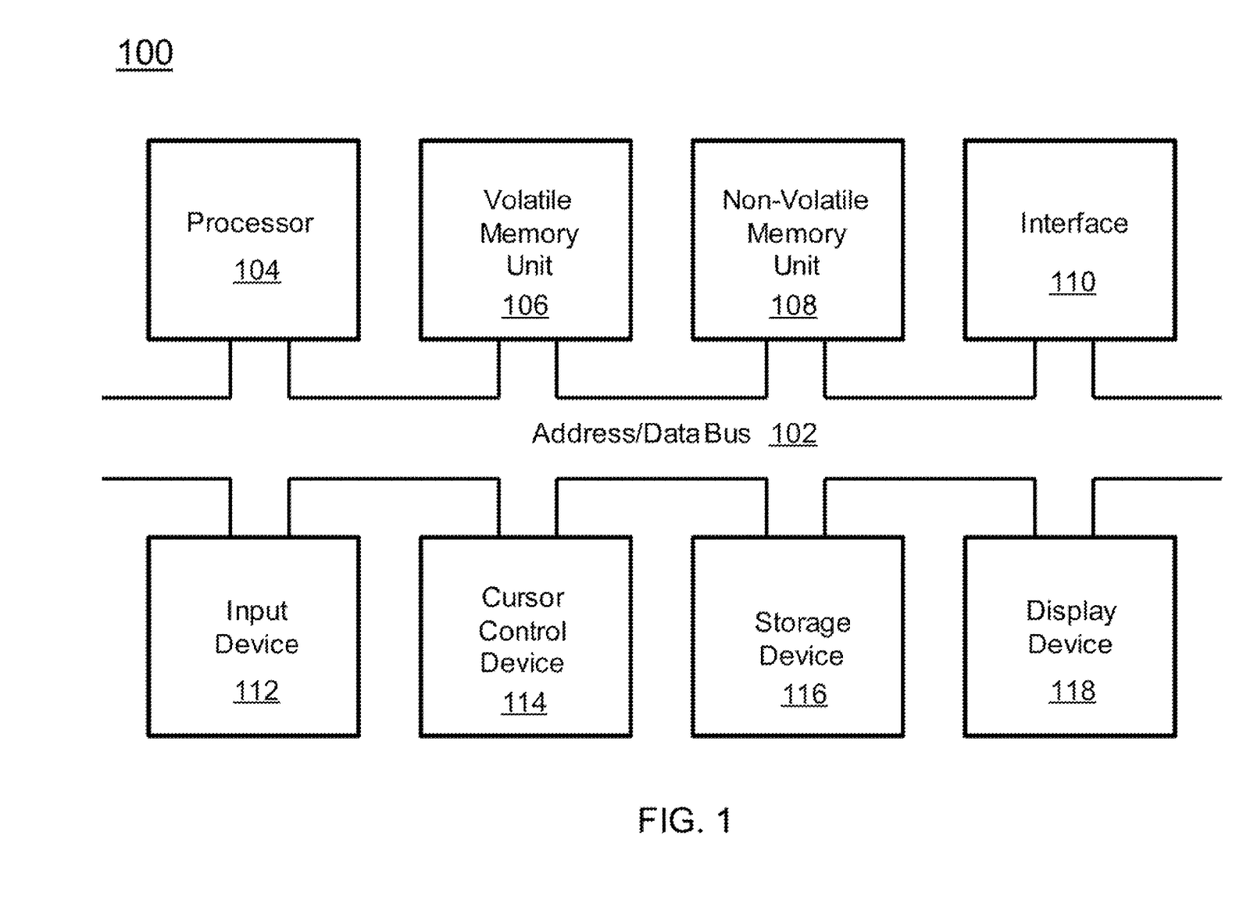
FIG. 1 is a block diagram depicting the components of a system for adjusting a predictive model to a changing environment according to the principles of the present invention.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, or a field programmable gate array.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
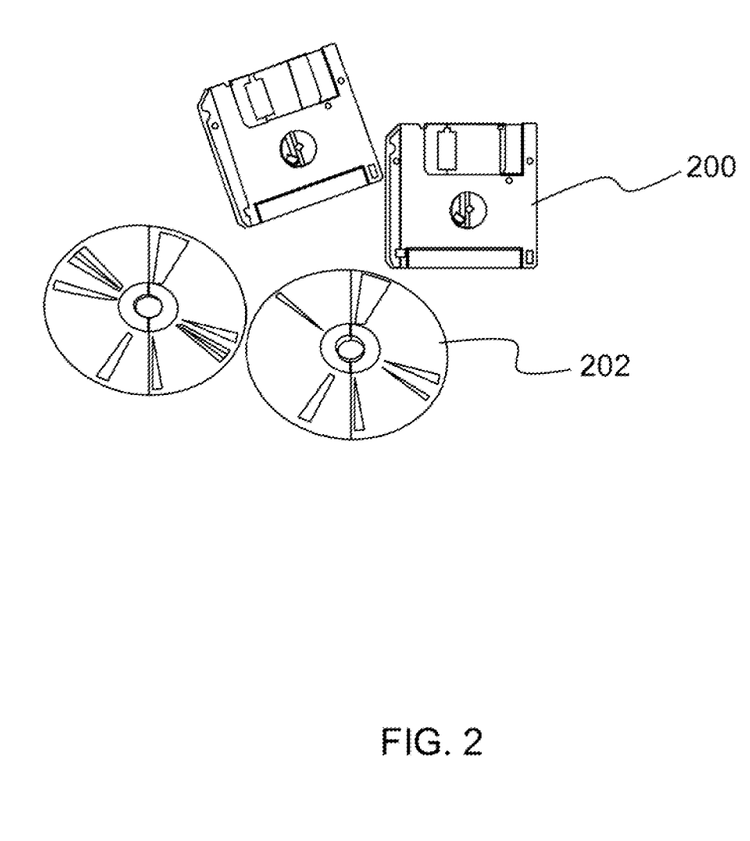
FIG. 2 is an illustration of a computer program product according to the principles of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) SPECIFIC DETAILS OF THE INVENTION

Described is a system for making autonomous systems such as a vehicle self-recover quickly in a critical situation. Self recovery is achieved by creating an up-to-date and adaptable predictive model of the system dynamics. The present invention allows for a quick adjustment of a predictive model to a changing system and/or environment. To do so, the system according to the principles of the present invention is a combination of switching between multiple predictive models that are simulated in parallel and having each model be able to adapt based on observed data, and then extrapolating beyond observed data all while concurrently controlling the vehicle. Thus, the heart of the invention is to link dynamic model selection, model adaptation, and model extrapolation.

A non-limiting application for an autonomous system is a self-driving car. A predictive model of a self-driving car is a computer simulation that predicts how the state of the car (e.g., position and velocity) changes given specific control commands (e.g., brake and accelerator states). If the predictive model of the car is known in any circumstance, then one can compute the control commands that would result in a desired state of the car. The prior art described in Literature Reference No. 3 presents a non-limiting example of such optimization.

Figure 3:
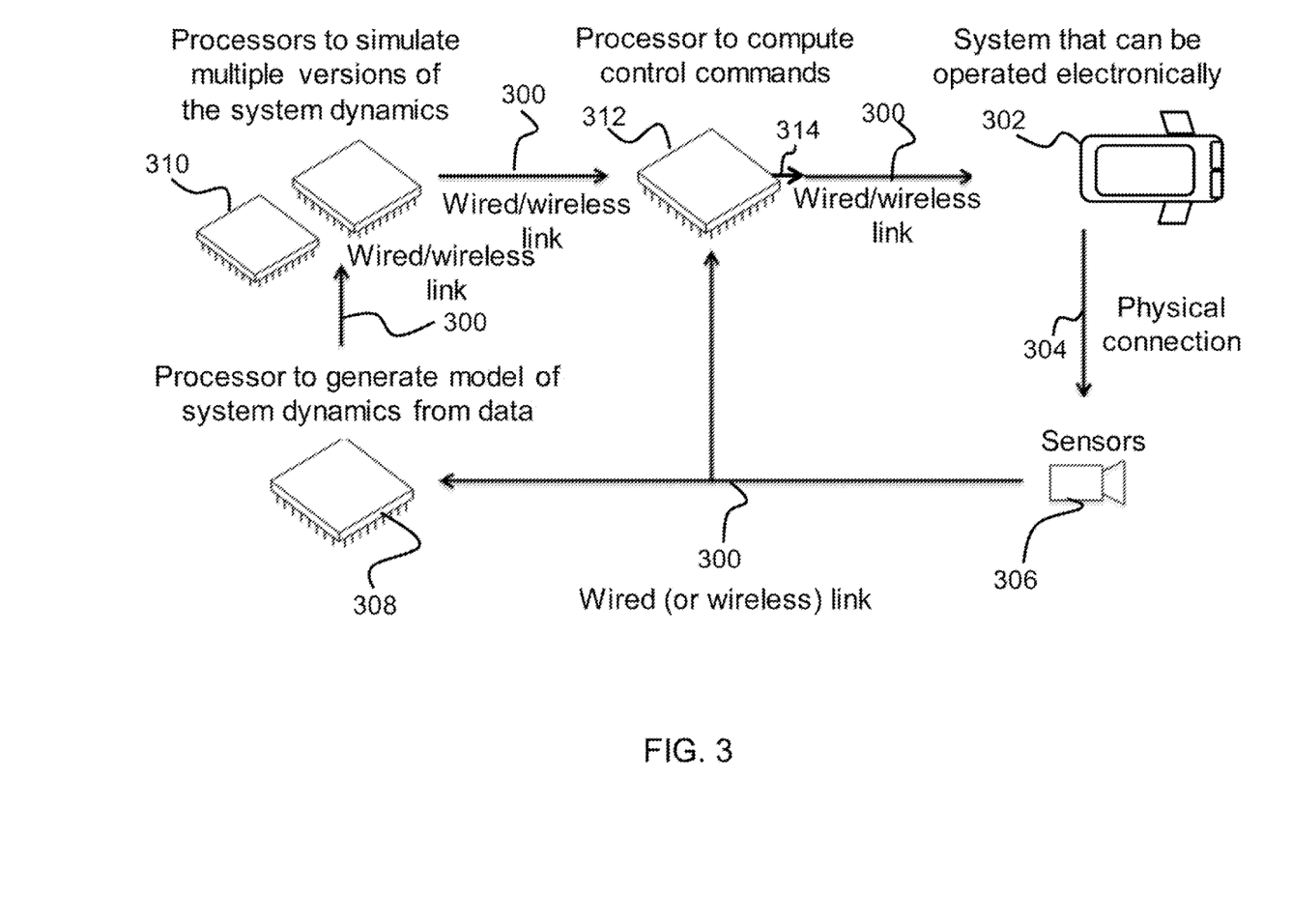
FIG. 3 is an illustration of the key elements of the system according to the principles of the present invention.

FIG. 3 illustrates the key elements of the system according to the principles of the present invention. In one embodiment, each element in FIG. 3 may be located in the vehicle 302. Similarly the elements in the system of FIG. 3 may be located in the vehicle 302 and some component(s) remote from vehicle 302. Each of the elements is connected through wired or wireless links 300, as depicted in FIG. 3. A system that can be operated electronically (e.g., vehicle 302) includes a physical connection 304 to at least one sensor 306 (e.g., visual sensor, audio sensor) that senses the current environment and/or state of the vehicle 302. Data from the at least one sensor 306 is sent to a processor 308 to generate a model of system dynamics from the sensor data from the at least one sensor 306. Then, multiple processors 310 simulate multiple model versions of the system dynamics of the vehicle 302. A processor 312 uses the multiple model versions to compute control commands 314 based on a selected model version.

Figure 4:
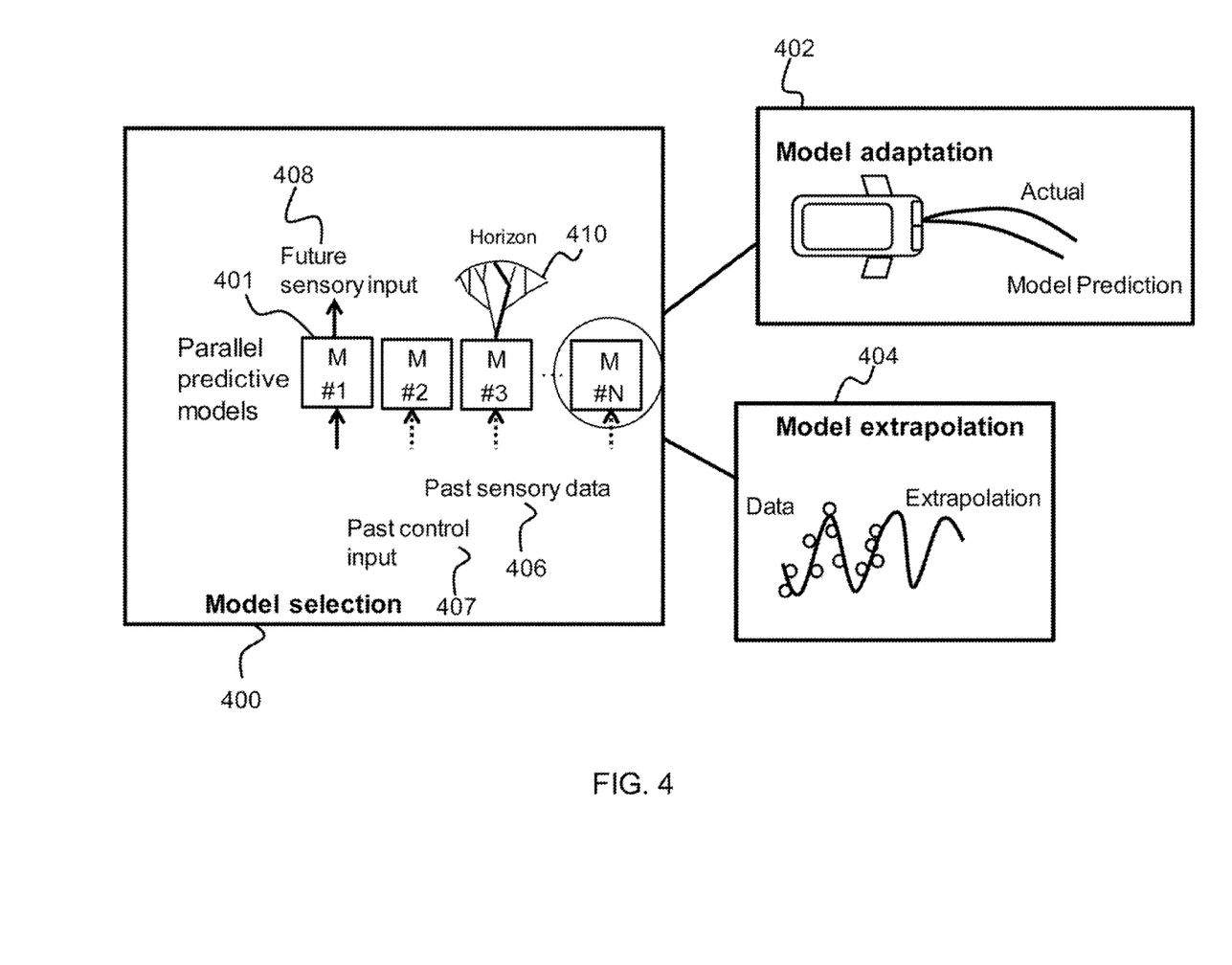
FIG. 4 is an illustration of a combination of three key functions that lead to the availability of an accurate predictive model even for unexpected situations according to the principles of the present invention.

In the present invention, model selection 400, model adaptation 402, and model extrapolation 404 (as illustrated in FIG. 4) are utilized. All three work together to maximize resilience to unexpected scenarios. FIG. 4 shows the combination of the three key functions (elements 400, 402, and 404) that lead to the availability of an accurate predictive model, even for unexpected situations. To achieve fast adaptation (<1 second) to component failure, for example and not to imply a limitation, the computer in the autonomous system (e.g., car) maintains multiple parallel predictive models (e.g., M #1, element 401). In a desired aspect, the predictive model 401 is a neural feed-forward network that maps sensory and control inputs (e.g., past sensory data 406 and past control input 407 data) onto future sensory input 408. In this non-limiting example, the multiple parallel predictive models (e.g., M #1, element 401) are multiple neural networks each having different training weights, since they are adapted to different scenarios/training conditions (e.g., dry and wet road). The horizon 410 is the number of model iterations for predicting a future outcome for each predictive model 401.

As a preparatory step, models are either trained or designed by a human for as many scenarios as feasible. If a failure occurs and leads to a scenario for which there is already a suitable model, the recovery could be, in principle, very fast; one just needs to switch between models in the model selection (element 400, FIG. 4) process.

Figure 5:
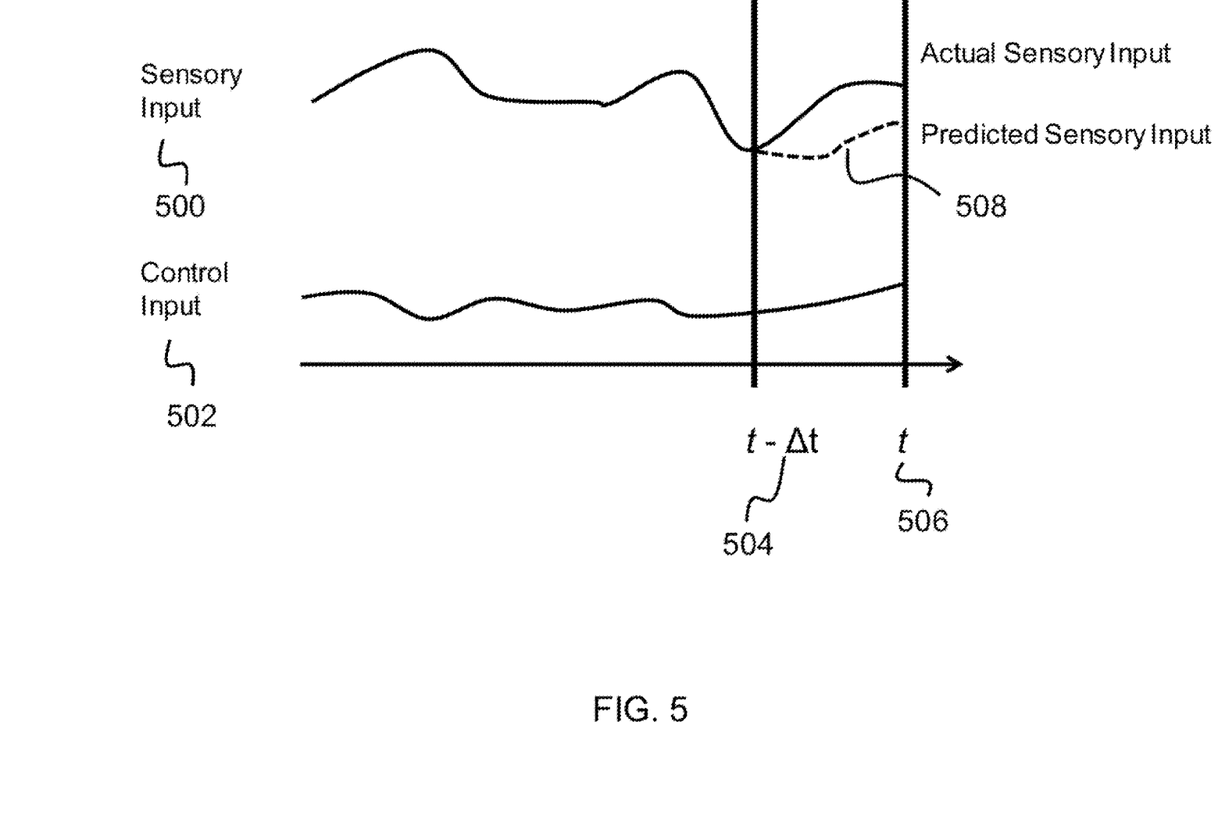
FIG. 5 is an illustration of a comparison of actual sensory input and predicted sensory input in a computer simulation according to the principles of the present invention.

To decide which model (e.g., M #1, element 401) to use during, for instance, vehicle operation, a predicted sensory input 508 in computer simulation is computed for each model and compared against actual sensory input 500, as shown in FIG. 5. The predicted sensory input 508 is obtained using data from the actual sensors up to some time prior to the current time (t−Δt 504) and data from a control input 502 up to the current time t 506. The comparison between the actual sensor input and the predicted sensor input at time t 506 provides a score that may be obtained from any of a variety of distance computations, such as the sum-squared error. This "matching" operation is depicted as "Good match?" 812 in FIG. 8. Such a decision could still be impaired by noise (i.e., a noisy sensory input 500 may trigger a model switch). Therefore, to make the model switch more robust against noise, the system according to the principles of the present invention comprises a hierarchical down-selection of models.

Figure 6:
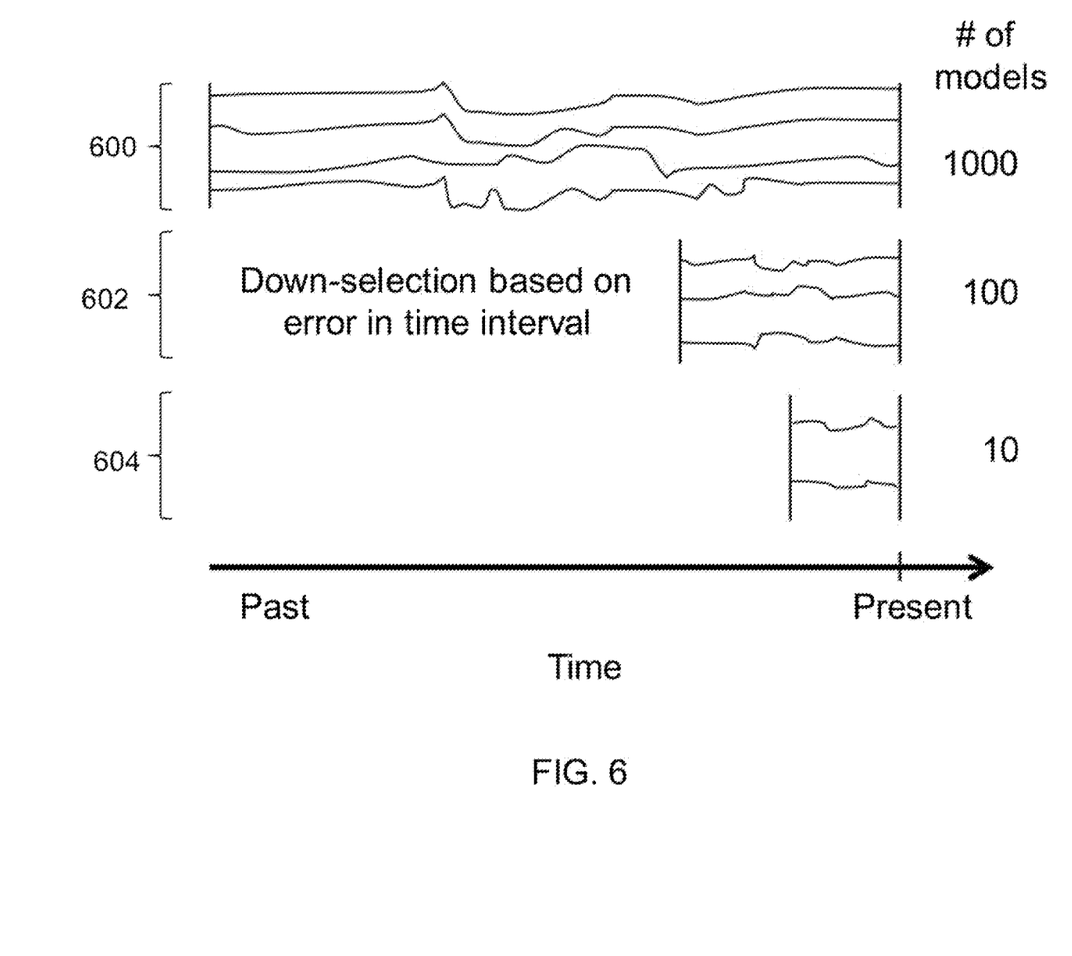
FIG. 6 is an illustration of the down-selection of competing predictive models according to the principles of the present invention.

FIG. 6 illustrates the down-selection of competing predictive models. The top portion 600 depicts the comparison of 1000 models against observations within a large time window/interval (i.e., large t−Δt 504) having a length. The middle portion 602 illustrates that among these, only 100 models were consistent with the observations, which were compared against each other in a shorter time interval having a length that is shorter than the length of the large time interval. The bottom portion 604 shows that out of the 100 models, only 10 models were consistent with the observations in the shorter time interval (here, the criteria became more stringent). Thus, the down-selection ensures that when selecting a new model based on a short time interval of observations, a choice is made only between those models that were somewhat consistent with prior data. The specific threshold will be case dependent. As the predictive models are compared over a cascade of time intervals (as depicted in FIG. 6), the number of predictive models compared at progressively shorter time intervals is progressively reduced.

The multiple model approach may be adapted to account for unexpected scenarios for which no model was designed or learned a priori. In one embodiment according to the principles of the present invention, this approach was combined with automatic model learning in a model adaptation (element 402, FIG. 4) process. In the present invention, there are two phases for such learning. First, during regular system (e.g., vehicle) operations, sensory data are collected and used to refine existing predictive models. Multiple machine learning methods exist for that purpose (see Literature Reference Nos. 7, 8, 9). Second, when new data is observed that is inconsistent with any previous model, a new model has to be learned. This adaptation will be on a slower time scale depending on the case. In one experimental study (described in Literature Reference No. 10), the adaptation took approximately 2 seconds; however, shorter durations are possible.

To learn a new model efficiently (i.e., with as little data as possible), the learning algorithm has to re-use prior learned functional relationships. A non-limiting example of such an algorithm is an artificial neural network, as described in Literature Reference No. 10, to which new neurons are added during learning (mimicking neurogenesis in biology). The added neurons change the functional relationship in a way that preserves prior structure.

Figure 7A:
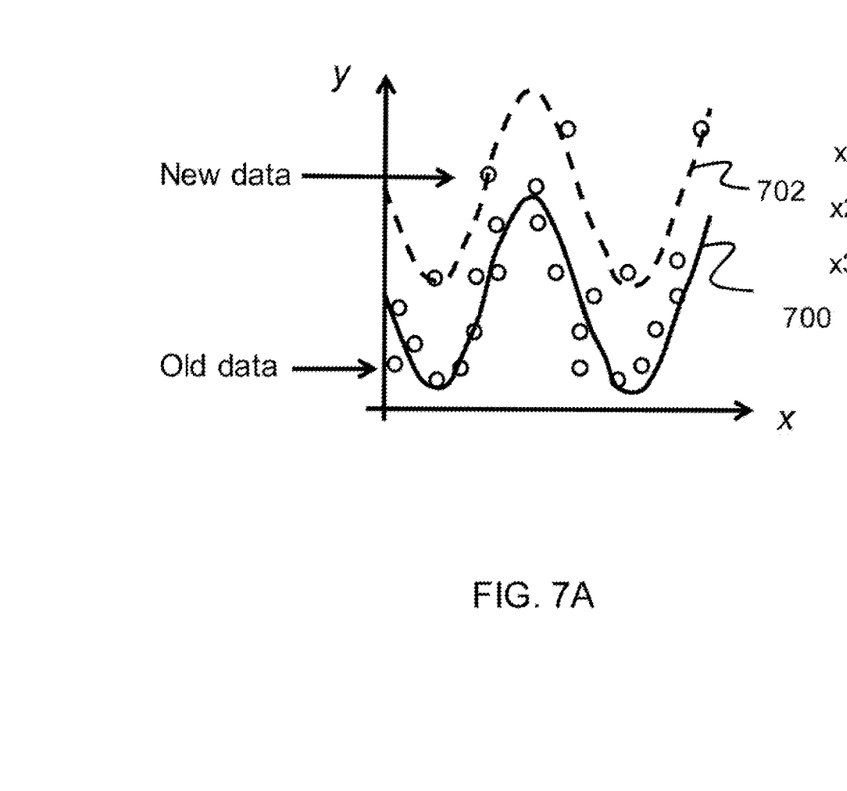
FIG. 7A is an illustration of how an artificial neural network adapts an a priori learned functional relationship to new data according to the principles of the present invention.
Figure 7B:
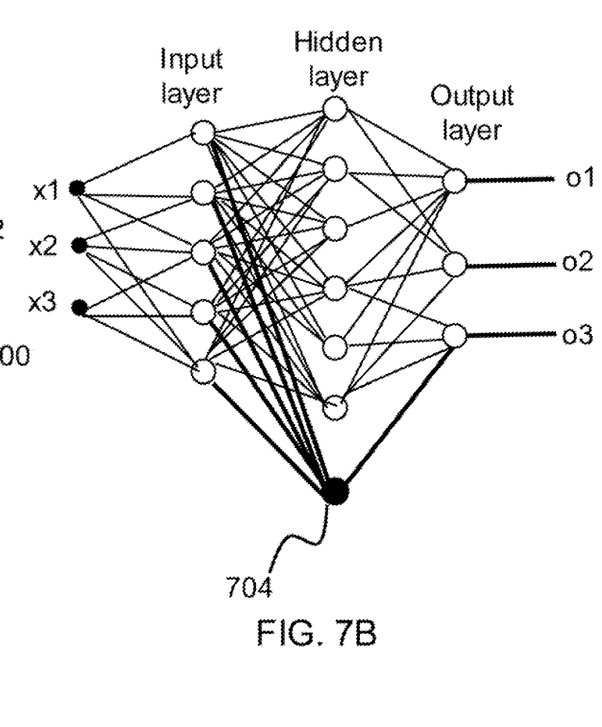
FIG. 7B is an illustration of an artificial neural network according to the principles of the present invention.

FIG. 7A illustrates how an artificial neural network adapts an a priori learned functional relationship (i.e., old data represented by the solid line curve 700) to new data (represented by the dashed line curve 702). Here, the new data (dashed line curve 702) could be explained by having an additional offset. Adding a new neuron (element 704 in FIG. 7B) to the network could result in such an offset.

With reference to FIG. 4, once a sufficient amount of data is collected to learn a new model, there is a need for the new model #N to be valid in a variable space that goes beyond the observed data. Thus, the new model #N needs to be able to extrapolate to new data regions in model extrapolation (element 404 in FIG. 4). Extrapolation is the process of estimating, beyond the original observation range, the value of a variable on the basis of its relationship with another variable. In the present invention, one approach is to extract from data the differential equation that would give rise to the data. A non-limiting example of this approach is described in Literature Reference No. 11. Knowing the underlying differential equation generally results in better extrapolation compared to function fitting.

Figure 8:
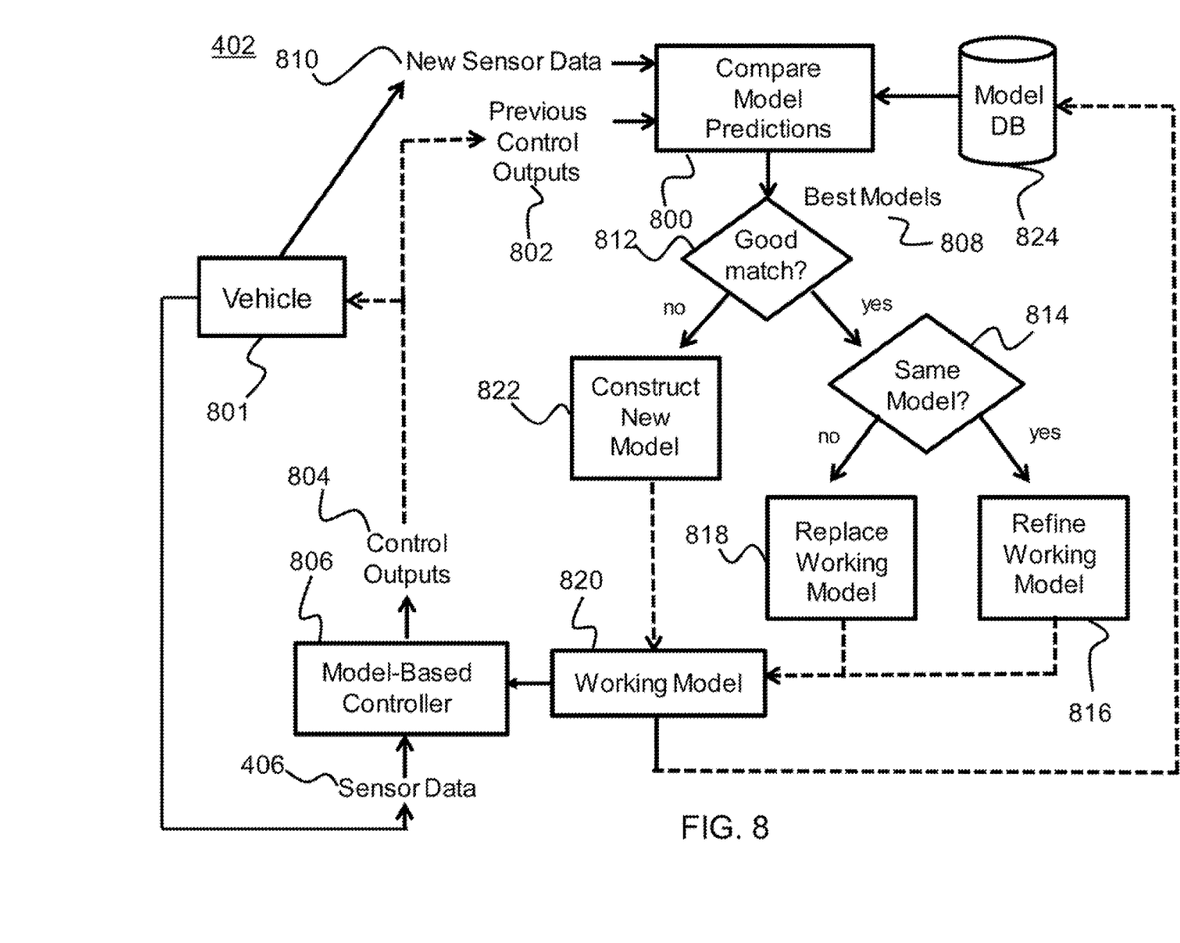
FIG. 8 is an illustration of a flowchart for model adaptation according to the principles of the present invention.

FIG. 8 shows a flowchart for model selection 400 and adaptation 402 in the system according to the principles of the present invention. In a compare model predictions step 800, each existing model is evaluated using the recent history of sensor data (referred to as past sensory data 406 in FIG. 4) from a vehicle 801 and previous control outputs 802, which are historical control outputs 804 from a model-based controller 806, such as a computer simulator. The best models 808 should be able to predict the current sensor states (i.e., new sensor data 810) based on past sensory data 406 and recent control actions (i.e., previous control outputs 802). Given that a good match 812 is found between an existing model and new sensor data 810, the current model (i.e., current working model 820) is updated either by refining the working model 816 or replacing it (replace working model 818), resulting in a new working model 820. The comparison provides a score that may be obtained from any of a variety of distance computations.

If no existing model provides a good match 812 of the new sensor data 810, then this mismatch indicates a likely anomaly. In that case, using the recent history of past sensory data 406 and previous control outputs 802, a new model is rapidly constructed/learned (construct new model 822), which becomes the new working model 820, which is used by the model-based controller 806, and is added to the model database (DB) 824 if it is a new one. As the new model is being constructed (construct new model 822), the system continues with the best matching model from the existing set. As described above, to learn (or construct) a new model efficiently (i.e., with as little data as possible), the learning algorithm has to re-use prior learned functional relationships. A non-limiting example of such an algorithm is an artificial neural network, as described in Literature Reference No. 10.

As non-limiting examples, the system described herein is applicable to autonomous driving, adaptive safety systems, flight control, underwater vehicle control systems, and process control systems. Resiliency is required for the final goal of fully autonomous cars, but also on the path to this goal, the system according to the principles of the present invention can enhance a semi-autonomous functionality. Resilient autonomous machines will further benefit commercial airplanes and defense systems (e.g., helicopters, unmanned aerial vehicles (UAVs)). State-of-the-art autopilots may still fail under unexpected situations, and the present invention would improve their reliability.

What is claimed is:

1. A system for controlling a vehicle using a set of competing adaptable predictive models of the dynamics of the vehicle, the system comprising:

one or more processors and a non-transitory computer-readable medium having executable instructions encoded thereon such that when executed, the one or more processors perform operations of:

using each competing adaptable predictive model, generating a set of predicted sensory data based on prior sensory data and prior vehicle control inputs, each competing adaptable predictive model comprising a neural network;

comparing each set of predicted sensory data with subsequent sensory data collected from the vehicle;

using the comparison of each set of predicted sensory data, automatically identifying one of the competing adaptable predictive models as a match;

if a match is identified,
modifying the adaptable predictive model that is the match according to a second set of sensory data, and
controlling the vehicle using control outputs generated using the match; and if a match is not identified,
generating a new adaptable predictive model through automatic model learning using the second set of sensory data, and
controlling the vehicle using control outputs generated using the new adaptable predictive model.

2. The system as set forth in claim 1, wherein the one or more processors further perform an operation of storing the matching adaptable predictive model or the new adaptable predictive model in a model database comprising the set of competing adaptable predictive models.

3. The system as set forth in claim 2, wherein the one or more processors further perform an operation of comparing a history of sensory data and previous control outputs for each competing adaptable predictive model in the set of competing adaptable predictive models against current sensory data describing the vehicle's current state in order to identify a match.

4. The system as set forth in claim 3, wherein the one or more processors further perform an operation of extrapolating current sensory data to new data regions.

5. The system as set forth in claim 4, wherein the one or more processors further perform an operation of using the matching adaptable predictive model in the set of competing adaptable predictive models while the new adaptable predictive model is being generated.

6. The system as set forth in claim 1, wherein j identification of the match in the set of competing adaptable predictive models is performed using a down-selection method that compares the set of competing adaptable predictive models over at least two time intervals of current sensory data, wherein the down-selection method ensures that when selecting a new adaptable predictive model, a selection is made only between those competing adaptable predictive models that are consistent with the history of sensory data.

7. The system as set forth in claim 1, wherein each competing adaptable predictive model is a feed forward neural network.

8. The system as set forth in claim 1, wherein each competing adaptable predictive model is trained or designed for a distinct vehicle driving scenario.

9. The system as set forth in claim 6, wherein a majority of the set of competing adaptable predictive models are compared over a first time interval of current sensory data having a length, and only the matches within that majority are compared over a second time interval of current sensory data within the first time interval having a length that is shorter than the length of the first time interval.

10. The system as set forth in claim 9, wherein the set of competing adaptable predictive models is compared over a cascade of time intervals of current sensory data having progressively shorter time intervals, wherein a number of the set of competing adaptable predictive models compared is progressively reduced.

11. A computer-implemented method for controlling a vehicle using a set of competing adaptable predictive models of the dynamics of the vehicle, comprising:
an act of causing a data processor to execute instructions stored on a non-transitory memory such that upon execution, one or more processors perform operations of:
using each competing adaptable predictive model, generating a set of predicted sensory data based on prior sensory data and prior vehicle control inputs, each competing adaptable predictive model comprising a neural network;
comparing each set of predicted sensory data with subsequent sensory data collected from the vehicle;
using the comparison of each set of predicted sensory data, automatically identifying one of the competing adaptable predictive models as a match;
if a match is identified,
modifying the adaptable predictive model that is the match according to a second set of sensory data, and
controlling the vehicle using control outputs generated using the match; and
if a match is not identified,
generating a new adaptable predictive model through automatic model learning using the second set of sensory data, and
controlling the vehicle using control outputs generated using the new adaptable predictive model.

12. The method as set forth in claim 11, wherein the one or more processors further perform an operation of storing the matching adaptable predictive model or the new adaptable predictive model in a model database comprising the set of competing adaptable predictive models.

13. The method as set forth in claim 12, wherein the one or more processors further perform an operation of comparing a history of sensory data and previous control outputs for each competing adaptable predictive model in the set of competing adaptable predictive models against current sensory data describing the vehicle's current state in order to identify a match.

14. The method as set forth in claim 13, wherein the one or more processors further perform an operation of extrapolating current sensory data to new data regions.

15. The method as set forth in claim 14, wherein the one or more processors further perform an operation of using the matching adaptable predictive model in the set of competing adaptable predictive models while the new adaptable predictive model is being generated.

16. The method as set forth in claim 11, wherein the identification of the match in the set of competing adaptable predictive models is performed using a down-selection method that compares the set of competing adaptable predictive models over at least two time intervals of current sensory data, wherein the down-selection method ensures that when selecting a new adaptable predictive model, a selection is made only between those competing adaptable predictive models that are consistent with the history of sensory data.

17. The method as set forth in claim 16, wherein a majority of the set of competing adaptable predictive models are compared over a first time interval of current sensory data having a length, and only the matches within that majority are compared over a second time interval of current sensory data within the first time interval having a length that is shorter than the length of the first time interval.

18. The method as set forth in claim 17, wherein the set of competing adaptable predictive models is compared over a cascade of time intervals of current sensory data having progressively shorter time intervals, wherein a number of the set of competing adaptable predictive models compared is progressively reduced.

19. A computer program product for controlling a vehicle using a set of competing adaptable predictive models of the dynamics of the vehicle, the computer program product comprising computer-readable instructions stored on a non-transitory computer-readable medium that are executable by a computer having a processor for causing the processor to perform operations of:
using each competing adaptable predictive model, generating a set of predicted sensory data based on prior sensory data and prior vehicle control inputs, each competing adaptable predictive model comprising a neural network;
comparing each set of predicted sensory data with subsequent sensory data collected from the vehicle;
using the comparison of each set of predicted sensory data, automatically identifying one of the competing adaptable predictive models as a match;
if a match is identified,
modifying the adaptable predictive model that is the match according to a second set of sensory data, and
controlling the vehicle using control outputs generated using the match; and
if a match is not identified,
generating a new adaptable predictive model through automatic model learning using the second set of sensory data, and
controlling the vehicle using control outputs generated using the new adaptable predictive model.

20. The computer program product as set forth in claim 19, further comprising instructions for causing the processor to perform an operation of storing the matching adaptable predictive model or the new adaptable predictive model in a model database comprising the set of competing adaptable predictive models.

21. The computer program product as set forth in claim 20, further comprising instructions for causing the processor to perform an operation of comparing a history of sensory data and previous control outputs for each competing adaptable predictive model in the set of competing adaptable predictive models against current sensory data describing the vehicle's current state in order to identify a match.

22. The computer program product as set forth in claim 21, further comprising instructions for causing the processor to perform an operation of extrapolating current sensory data to new data regions.

23. The computer program product as set forth in claim 22, further comprising instructions for causing the processor to perform an operation of using the matching adaptable predictive model in the set of competing adaptable predictive models while the new adaptable predictive model is being generated.

24. The computer program product as set forth in claim 19, wherein the identification of the match in the set of competing adaptable predictive models is performed using a down-selection method that compares the set of competing adaptable predictive models over at least two time intervals of current sensory data, wherein the down-selection method ensures that when selecting a new adaptable predictive model, a selection is made only between those competing adaptable predictive models that are consistent with the history of sensory data.

* * * * *